United States Patent [19]
Ploshkin

[11] Patent Number: 5,606,859
[45] Date of Patent: Mar. 4, 1997

[54] INTEGRATED STEAM MOTOR

[76] Inventor: Gennady Ploshkin, 1670 56th Street, Suite 311, Delta, British Columbia, Canada, V4L 2M7

[21] Appl. No.: 103,546

[22] Filed: Aug. 9, 1993

[51] Int. Cl.$^6$ ................................................. F01K 11/00
[52] U.S. Cl. .......................... 60/669; 60/645; 60/670; 60/715; 60/716
[58] Field of Search .................. 60/669, 645, 670, 60/715, 716, 39.76, 39.8, 39.81, 39.821, 39.827; 91/152, 490, 499, 503, 480, 159, 161; 122/41, 451.2, 452; 239/87, 533.1, 533.2, 412, 413, 417.5, 418; 431/1, 171, 172

[56] References Cited

U.S. PATENT DOCUMENTS

| | | | |
|---|---|---|---|
| 671,386 | 4/1901 | Peet . | |
| 748,559 | 12/1903 | Peet | 91/161 |
| 1,364,508 | 1/1921 | Moody | 91/499 |
| 1,515,378 | 11/1924 | Williams | 91/480 |
| 1,719,757 | 7/1929 | Van Reede | 91/161 |
| 2,387,391 | 10/1945 | Green | 122/41 |
| 3,572,215 | 3/1971 | Harris | 91/480 |
| 3,720,188 | 3/1973 | Mead | 122/41 |
| 3,745,887 | 7/1973 | Striegl | 92/146 |
| 3,771,419 | 11/1973 | Hyde | 91/6.5 |
| 4,262,579 | 4/1981 | Harris | 91/480 |
| 4,278,050 | 7/1981 | Kime | 122/39 |
| 4,395,881 | 8/1983 | Fraser | 60/521 |
| 4,395,885 | 8/1983 | Cozby | 60/669 |
| 4,509,464 | 4/1985 | Hansen | 123/1 A |
| 4,539,894 | 9/1985 | Harris | 92/138 |
| 4,693,087 | 9/1987 | Lagow | 60/699 |
| 4,910,963 | 3/1990 | Vanzo | 60/641.8 |
| 5,048,497 | 9/1991 | Kishida et al. | 239/417.5 |
| 5,372,483 | 12/1994 | Kimura et al. | 91/499 |

Primary Examiner—Ira S. Lazarus
Assistant Examiner—Alfred Basichas
Attorney, Agent, or Firm—Thomas W. Secrest

[57] ABSTRACT

This invention is directed to an engine having an external combustion chamber for creating a vapor under high pressure. The vapor under high pressure is introduced to a high pressure cylinder for moving a high pressure piston. The vapor, upon leaving the high pressure cylinder, flows to a low pressure cylinder for moving a low pressure piston. The pistons are attached by connecting rods to a swash plate. The pistons move in a rectilinear movement. The swash plate converts the rectilinear movement to a rotary movement for a rotary output crankshaft. The external combustion chamber can be fueled by air and also by a solid, liquid, or vapor. The solid can be powdered coal. The liquid can be hydrocarbons or an organic material. The vapor can be one of many such as a product of combustion of hydrogen and oxygen. The hydrogen and oxygen can be burned to produce a high temperature and high pressure steam. The introduction of high pressure vapor into the cylinders and running of the engine is self-timing due to the metering system for metering a liquid such as water to be turned into vapor or hydrogen and oxygen into the pressure chamber for burning and conversion into water. A set amount of liquid or hydrogen and oxygen are introduced and made into steam to be introduced into the high pressure cylinder. There is an introduction of combustible material and vapor which is then released to the high pressure cylinder and this process continues. The metering system is mechanical and self-regulatory. One of the main advantages of this invention is that there are few moving parts and a simple control system for controlling the speed of operation of the engine.

17 Claims, 8 Drawing Sheets

INTEGRATED STEAM MOTOR

BACKGROUND OF THE INVENTION

The present invention relates to a steam engine and more particularly to an improved single acting multiple expansion swash plate steam engine. Furthermore, this invention relates to steam engines independent of conventional boilers, having a steam producing apparatus permanently attached to the engine. Also, since conventional steam is not the only feasible working media, the engine relates to external combustion engine of multiple choice working media such as other materials which can vaporized like organic liquids and mercury. Furthermore, this invention relates to multiple fuel external combustion engines which can use vaporous or liquid or solid fuels.

Presently, there is considerable interest in providing improved engines for driving machinery, especially those engines which can be more environmentally and people-friendly, having a higher fuel efficiency and lower production costs, when compared to conventional internal combustion engines.

| PATENTEE | PATENT NUMBER |
| --- | --- |
| MARION K. HARRIS | 3,572,215 |
| GEORGE N. J. MEAD | 3,720,188 |
| GEORGE STRIEGL | 3,745,887 |
| ROBERT W. HYDE | 3,771,419 |
| MARION K. HARRIS | 4,262,579 |
| WELLESLEY R. KIME | 4,278,050 |
| JAMES P. FRASER | 4,395,881 |
| JOHN A. COZBY | 4,395,885 |
| HERBERT N. W. HANSEN | 4,509,464 |
| MARION K. HARRIS | 4,539,894. |

In reviewing these patents, I did not find any patents, in my opinion, which anticipated the subject of this invention. I did not find any patents which, in my opinion, were close to the subject invention. Therefore, I consider that the subject invention is not anticipateed by the prior art of my knowledge.

THE GENERAL DESCRIPTION OF THE INVENTION

The present invention provides an improved, single acting steam engine integrated with a novel type steam generator. It is suitable for a wide variety of applications ranging from land and sea transportation vehicles to major power plants to household generators and appliances. The simplicity of its construction, operation and maintenance, together with its hazard-free, smooth and low noise level action, make the present invention in many ways superior to an available internal combustion engine.

In an exemplary embodiment of an integrated steam motor of the present invention, there is provided a compound engine. While an integrated steam motor of the present invention may have any number of cylinders from a minimum of two, this subject embodiment has a total of six cylinders encased radially in a revolver barrel-like engine block. There are three high-pressure cylinders and three low-pressure cylinders. The high pressure cylinder and the low pressure cylinder are in a series. The steam from the high pressure cylinder flows to the low pressure cylinder. Within each cylinder, there is a piston with a spring-loaded pressure-relief valve in its crown. The piston reciprocates between two extreme positions determined by limited movement of a wobbling swash plate on which the piston exerts its working stroke pressure by means of a connecting rod. The engine has a common cover for all its six cylinders, or a cylinder head. The cylinder head, together with the engine block, houses a steam, or another working media, distribution mechanism, rotating at the speed of a crankshaft during the operation. The cylinder head also mechanically connects to a torroidal shaped high pressure vessel of a steam or vapor generator, enclosed in a combustion chamber, or furnace housing, assembled around the pressure vessel. By either a conventional burner unit using a selected fuel outside of the pressure vessel, or by burning a hydrogen-oxygen mixture inside the pressure vessel, a high pressure steam is generated according to exact demand of the operating engine. This demand for working media under pressure is satisfied by two novel devices. First, an automatic water injector fitted into the pressure vessel serves as a governor for speed of rotation of the output shaft and acts independently of any other controlling device, except for pressure variations inside the pressure vessel. Secondly, an automatic hydrogen-oxygen mixture burner working alone or together with the automatic water injector. In this case, the engine operates without an exothermically external burner using liquid or gaseous fossil fuels. The hydrogen and oxygen combust in the pressure vessel to form steam and give off heat energy. With the pressure of any gaseous working media inside the torroidal pressure vessel rising, the integrated steam motor of the present invention will start working, providing the combustion is sustained at the designed parameters by either a burner outside of the pressure vessel or by combust inside the pressure vessel. The high pressure working gaseous media is admitted into one of three high pressure cylinders according to the designed timing built into a steam distributor. The high pressure steam is admitted to the high pressure cylinders sequentially causing rotation of the output crankshaft via a mechanical connection to it. In either configuration, having a conventional fossil fuel burner outside of the pressure vessel, or the hydrogen-oxygen burner inside the pressure vessel, the speed of output shaft rotation and output of the engine relative to a load are easily adjusted by regulating the tension of the spring, or the length of a stroke of the piston. This makes them the only governor an integrated steam motor of the present invention requires. A working media such as steam is admitted to one cylinder at a time of the three high pressure cylinders when its piston reaches, in terms of internal combustion engine, so called Top Dead Center. The steam pressure drives the piston toward the swash plate and the steam starting valve closes approximately one-third of the piston stroke after which, the piston is driven by expansion of the working media such as steam inside the cylinder. At the point of steam cut-off to the first high pressure cylinder, or one-third of its piston's stroke, the next in-line cylinder in the direction of the crankshaft rotation, in this case low pressure cylinder, the low pressure piston starts its power stroke on steam exhausted from the high pressure cylinders. The exhaust steam is stored in a hollow space inside the engine block as a working media for the low pressure cylinder. This is similar to multi-expansion steam engines and turbines. By the time the first high pressure piston completes two-thirds of its power stroke and the next in-line first low pressure piston one-third of its power stroke, the high pressure gaseous working media, or steam, is admitted to the second high pressure cylinder in the direction of rotation and which is the third-in-line cylinder. In this instance, the second high pressure cylinder starts its power stroke. And so, at any given moment of operation of the integrated steam motor of the present invention a one-half of all the cylinders, regardless of the numbers, is continuously at a power stroke. The integrated steam motor of the present invention does not depend on a compression stroke with all the thermal and mechanical losses that come with it. Again, this engine does not have a compression stroke.

The conversion of the reciprocating movement of the pistons into the rotation of the crankshaft in the integrated steam motor of the present invention is achieved by a swash plate. The swash plate is prevented from rotation by two slide and roller arrangements, allowing the swash plate to wobble only, so the crankpin in the swash plate can rotate to produce an output on the flywheel end of the crankshaft.

When operating on fossil fuel in a conventional external burner, burnt exhaust gases exit via the exhaust outlet of the external burner. However, when the integrated steam motor of the present invention is run on a hydrogen-oxygen mixture, the exhaust inside the torroidal pressure vessel is high pressure and high temperature steam and the only exhaust produced by the engine is the low pressure steam from the low pressure cylinder. The low pressure steam from the low pressure cylinders comes out of the lower part of the engine block and can be exhausted into the atmosphere, or into a conventional condenser, depending on the application of the engine.

OBJECTS AND ADVANTAGES

A primary object of this invention is to provide a new type of environmental-friendly and people-friendly prime mover capable of replacing internal combustion engine worldwide.

Another object of this invention is to provide a new type of external combustion engine with a higher thermal efficiency than the thermal efficiency of an internal combustion engine.

A further object of the invention is to provide a new type of external combustion engine with a higher mechanical efficiency than the mechanical efficiency of an internal combustion engine.

Still another object of this invention is to provide a new engine free of the potential hazards associated with the operation of conventional internal combustion engine, namely, crankcase explosions, dieselling and runaways, exhaust system fires, starting air system explosions, bursting of hot lubricating oil, hot water or fuel lines under pressure, and many other potential hazards harmful and often deadly to the operator, as the conditions for these hazards do not exist with this engine.

A still further object of this invention is to provide a new vibration-free engine with a low noise level for a wide variety of application where noise and vibrations are of a primary concern.

A further object of this invention is to provide a new engine which requires no lubrication under pressure, no cooling under pressure, no fuel under extremely high pressure and no expensive, bulky and hazardous systems and independently driven machinery using extra power sources for their operation, on which internal combustion engine, especially on marine and stationary power plant application depend.

Still another object of this invention is to provide a new type of steam engine or vapor engine for a wide variety of applications independent of conventional boilers and machinery and systems serving conventional boilers, or steam-makers, operating on steam produced by a steam generator integrated with said engine as one unit.

Also, an object of this invention is to provide a new steam engine integrated with a high efficiency, explosion-proof, compact and relatively (to conventional boilers, their size, weight, dependence on other machinery and systems, etc.) inexpensive steam generator.

Another object of this invention is to provide a new steam engine integrated with a steam generator which can operate on external combustion of gaseous and liquid fossil fuels as well as on internal combustion inside the pressure vessel of said steam generator of hydrogen-oxygen mixture, without expensive and lengthy modification.

A further object of this invention is to provide a new steam engine integrated with a fully automated steam generator, controlled by a compact, simple, reliable and inexpensive device, which also represents the only governor the engine requires to adjust itself to, for instance variable load demand.

Still another object of this invention is to provide a new steam engine integrated with a fully automated steam generator simply adaptable to burning a hydrogen-oxygen mixture, thereby producing steam inside the pressure vessel without external heat source of a fossil fuel burner, in which safe, explosion-proof mixing and burning of hydrogen and oxygen is achieved by means of a simple, reliable, inexpensive apparatus also serving as governor for regulating the engine's speed and output relative to variable demands, regardless of an application of the engine.

Another object of this invention is to provide a new engine with a higher power-to weight ratio than any of the known types of heat engines presently in use, except for gas turbines.

A still further object of this invention is to provide a new engine for marine industry, to which a wide variety of the existing vessels worldwide could be converted cost-effectively with further gains to the environment, operators and ship owners in operating and maintenance costs, reliability, ship's space saving for a main engine itself plus tanks capacity saving for no longer needed lubricating oils and extra fresh water.

Another object of this invention is to provide a simple, reliable, safe and self-efficient directly reversible marine engine which will revolutionize the ship design by totally eliminating a variety of bulky, expensive and hazardous machinery and systems presently serving conventional marine internal combustion or steam powered installations.

A further object of this invention is to provide a new engine for a wide variety of applications representing a heat to mechanical energy converter of an ultimate simplicity relative to a computerized design and fully automated manufacturing for a cost-efficient production and transfer of technology by a software package.

A still further object of this invention is to provide a new engine for a wide variety of applications, the simplicity of which will make it possible for people with an absolute minimum of technical training to assemble, run, maintain, repair and upgrade it even at home using a simple guide.

Another object of this invention is to provide an advanced substitute for internal combustion engines worldwide representing an engineering simplicity to which presently depending upon internal combustion engine people and industries could easily adopt with a better position on the world market.

The objects stated above and other related objects are accomplished by providing a revolver barrel-like engine block with a plurality of cylinder liners inserted into them.

Inside each cylinder liner is a piston, which is moved by the pressure of a working media such a steam or a vapor. This produces useful work converted to rotary torque available at the flywheel end of a crankshaft. This invention also represents an over 30 years of dedication to the marine industry by a marine engineer educated in Russia and who has served with various shipping companies worldwide. The inventor has sailed many ships and many seas to become a Chief Engineer, but more importantly, a strong believer that there must be a better way to move ships than with the present internal combustion engines. He has also believed, since his marine school days on a steam tug, that steam's potential of a working media has not been exhausted yet.

The advantages of an integrated steam motor of the present invention are best observed from, for instance, a standpoint of a marine engineer with an extensive experience as an engineering designer, technologist, machinist, marine power plant operator from a junior to senior position as well as a man in charge of efficiency and safety of his crew. What he sees in a conventional deep sea ship's power plant is a waste of money, ship's space, perpetuating hazards, endless noise and vibration for the passengers and the crew, needless complexity of the installation and endless breakdowns creating emergencies and injuries, etc. The bestsellers on the world marine engine market today are so called medium-speed engines which require and cannot be used without the following machinery and related systems.

1. A conventional boiler with related machinery and systems to preheat the main engine for start-up.
2. A power-generating (auxiliary) plant to provide, besides the ship's need for lighting, heating, air-conditioning, cooking and preserving food by refrigerating (all these needs commonly regarded an non-essential in marine language worldwide), for operating the above-mentioned boiler with its burners and pumps plus seawater pumps for cooling fresh water circulating for cooling purposes inside the engine, jacket water (which cools the engine), pumps, lubricating oil pumps, fuel booster pumps, centrifuges (lubricating oil and fuel purifiers), air supply fans, various safety devices and alarms mounted on the engine and electrically activated together with a governor and remote controls. On top of the group of accessories, another group of rather less essential machinery serving the main engine, like fuel and lubricating oil transfer pumps, prelubricating pumps, engine turning gear, starting air compressors and air storage tanks, used oil transfer pumps, to name just a ship's basic propulsion plant. On top of all this equipment into which an investment is made simultaneously with the purchase of the main propulsion machinery, there is a bulk, length and installation cost of endless pipe and power supply lines making them work and doubling the cost of all the equipment by the time it is installed on a ship.
3. A reduction gear box with flexible couplings and inflatable (all common types) clutch, turning gear, prelubricating pump, oil coolers, controls and monitors—weight and costwise usually almost equal to the main engine itself.

All of the above added to the main engine dramatically diminish the already very poor power-to-weight ratio of the main engine. Add to this the manufacturing and maintenance costs, devastating environmental impact caused by using internal combustion engines worldwide, health hazards to operators and the other mentioned before consequences of using internal combustion engines (in this case, on a conventional ship) and most people familiar with the latest developments in engineering sciences and technology would think about better ways to use our energy resources and the environment. One of the better ways is an integrated steam motor of the present invention. Which, when installed on the above-mentioned conventional deep sea ship instead of the described earlier modern, bestselling marine diesel engine and auxiliary machinery supporting it, provides the following advantages:

1. It eliminates the need for all auxiliary machinery described above, which more than doubles the costs of purchasing, installing, running and maintaining the main engine, which greatly increase ship's weight, wasted space, potential hazards; adds to environmental pollution, the noise and the vibration to the ship.
2. It borrows only a fraction of electric power from a generating plant, serving as essential, ship's needs for lighting, heating, air-conditioning, cooking and preserving food by refrigerating, which could be provided by a power generating plant run by a smaller version of integrated steam motor. In which case, it would require a small, like a conventional starting battery, electric power source to operate its burner at the start. There would be no more waste and hazards of any kind.

That is only one example of replacing internal combustion engines with an integrated steam motor in a single sector of economy alone.

THE SPECIFIC DESCRIPTION OF THE INVENTION

Figure 1:
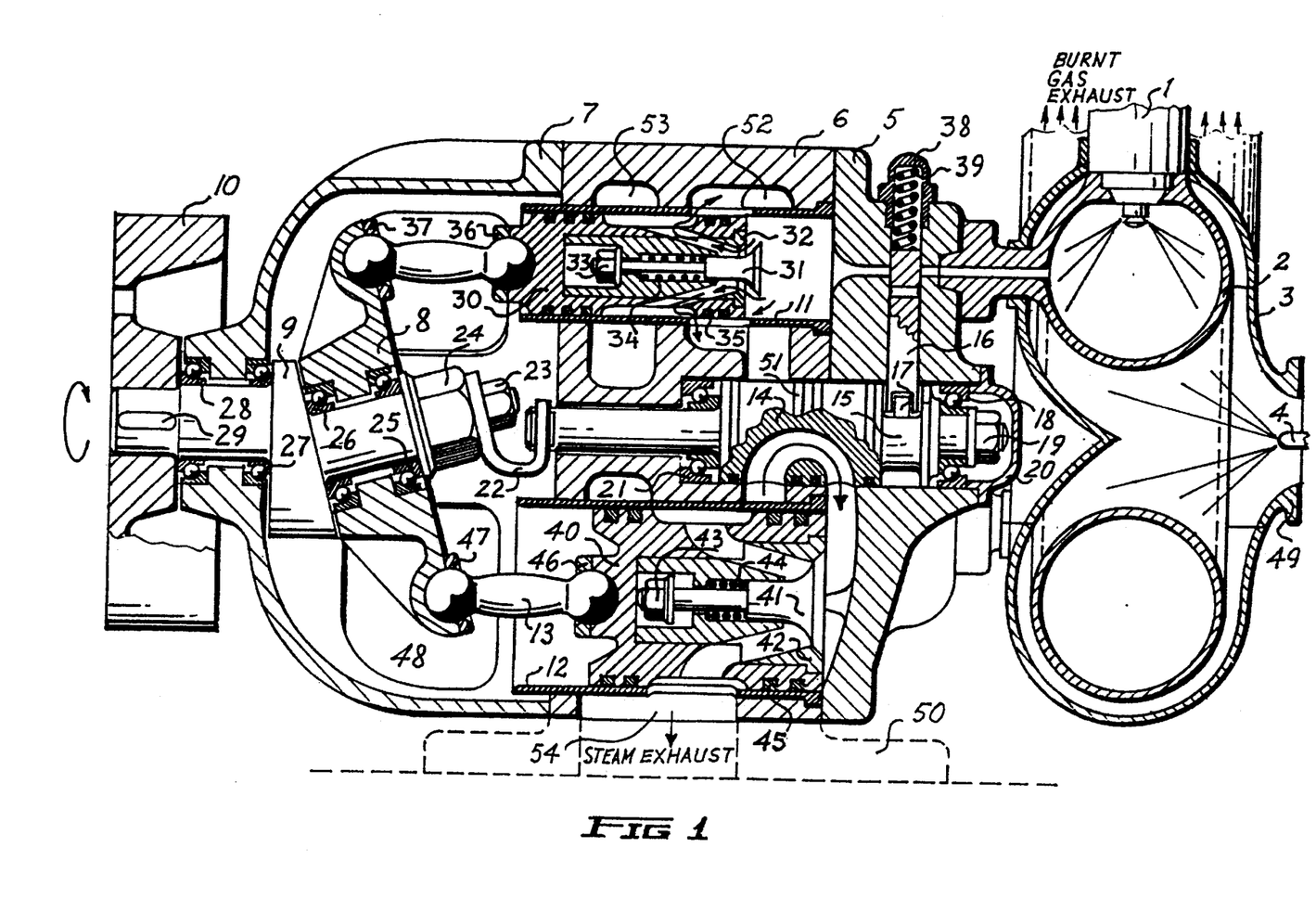
FIG. 1 is a longitudinal cross-sectional view of a six cylinder version of an integrated steam motor of the present invention, illustrating the exhaust stroke of upper piston in the high pressure cylinder and the swash plate.

With reference to the drawings, wherein like reference characters designate identical or corresponding parts, and more particularly to FIG. 1. FIG. 1 is a longitudinal cross-sectional view of a six cylinder version of the integrated steam motor and is shown as having an automatic water injector assembly 1 mechanically pressure-tight secured on a torroidal pressure vessel 2 enclosed in a furnace assembly 3. There are conventional burners 4 mechanically connected to said furnace assembly 3 at a flange 49. The burners can introduce fuel such as powdered coal or wood dust; liquid fuel such as hydrocarbons like kerosene or diesel or alcohol such as methanol and ethanol; and, a gas such as natural gas or liquefied petroleum gas. The above-mentioned components represent an automatic steam generator using a conventional burner mounted externally. In addition, the engine is convertible to an internal burner of hydrogen-oxygen mixture inside said pressure vessel. Said automatic steam generator is mechanically, pressure-tight connected to the rest of said engine via a cylinder head block 5 united with an engine block 6. A crankcase 7 is also united with the engine block 6 so that 5, 6 and 7 work together as a mechanical unity. Inside said crankcase 7 is a swash plate 8 which wobbles on a crankshaft 9 forcing it to rotate an output coupling 10 combined with flywheel.

The conversion of heat energy into mechanical energy or mechanical power begins inside a high pressure cylinder liner 11 and continues inside a low pressure cylinder liner 12 as can visually be noticed through openings 48 in the crankcase 7 when connecting rods 13 begin to move rectilinearly transmitting the pressure of a working media inside said cylinders to the crankshaft via the swash plate so as to rotate 10. The timing and sequence of admitting high pressure steam from said steam generator to one or another of said three high pressure cylinders and low pressure steam to said three low pressure cylinders is provided by a rotating steam distributing rotor 14 integral with a cam 15. The cam periodically opens starting valves 16 riding on said cam by means of a roller 17 for minimum friction losses. To further minimize the friction between rotating steam distributor rotor 14 and the stationary engine block which accommodates it are conventional sealed ball bearings 18 and 21. The ball bearings 18 and 21 are mechanically secured in position by a nut 19 and a cover 20. The precise follow-up of the crankshaft rotation is so important to the steam distributor's timing that its connector 22 is solidly attached to the crankshaft 9 and secured on it with a nut 23. The swash plate is prevented from sliding off of the crankshaft by means of a nut 24. The almost frictionless rotation of the crankpin inside the wobbling swash plate is achieved by means of another pair of standard sealed ball bearings 25 and 26. Another important bearing, the main journal bearing of the crankshaft rotates on standard sealed ball bearings 27 and 28. As contrasted with internal combustion engines, this eliminates a common problem to internal combustion engine friction white metal bearings requiring pressurized lubrication by hot circulating oil with all the implications that come with it.

There is a high pressure cylinder 11 and piston 30. In FIG. 1, it is seen that the high pressure piston has reached the extreme left position. In the internal combustion engine's terminology, this is known as Bottom Dead Center. At this point, while the energy of the still expanding working media or steam, still maintains its pressure on the piston, exhaust ports in the cylinder liner walls 11 are just being uncovered. This causes a sharp drop in the pressure of the working media within the cylinder and a spring 34 in the piston is now opening a pressure relief valve 31 to help the working media to escape into high pressure steam storage space 52 within the engine block. This pressure relief valve 31 will stay open as the piston moves to the extreme right, or in the terminology of an internal combustion engine, Top Dead Center. This ensures a passage for the escaping working media which is still under enough pressure to move a low pressure piston 40 in the low pressure cylinder liner 12. Therefore, there is no compression stroke in the integrated steam motor of the present invention. There is only a power stroke and an exhaust stroke. However, the exhaust pressure in the high pressure cylinder liner 11 is higher than atmospheric pressure and does offer some resistance to the movement of the piston 30 on its exhaust stroke. These losses are negligible as compared to the losses of the compression stroke of an internal combustion engine. The high pressure piston assembly, in addition to the piston 30, also comprises of a relief valve cage housing 32 of the above-mentioned pressure relief valve with the calibrated spring 34 held pre-loaded with a nut 33. Several seal rings 35 on the piston 30 eliminate leaks of high pressure working media into the lower pressure areas including the crankcase. Similarly assembled is the lower pressure piston 40, where a proportionally larger pressure relief valve 41 has its own assembly of a valve cage 42, a nut 43 and a spring 44. A plurality of seal rings 45 on this piston 40 prevents leaks of working media to the lower pressure areas, or in terms of internal combustion engine, to ensure the compression. Always under compression stress, the connecting rods 13 have no chance of falling out of their sockets on the pistons and in the swash plate, but, nevertheless are provided with simple retainer flanges 36, 37, 46 and 47. This is for the convenience of assembly and disassembly of the connecting rods and the swash plate. The steam distributor position shown on FIG. 1 has the high pressure steam passage to the high pressure cylinder cut off, since its piston is on the exhaust stroke, while the low steam pressure passage is open to the lower pressure cylinder liner 12. The piston 40 has reached Top Dead Center and is ready for a power stroke of its own. Comparing this position of both high and low pressure pistons with those of FIG. 2, after a 180-degree turn of the crankshaft, the opposite is observed. The high pressure piston 11 is at the top dead center and high pressure working media is entering the cylinder via starting valve 16, while the low pressure piston is at the end of its power stroke and its exhaust stroke is beginning with the uncovering of the exhaust ports. As it is in the high pressure cylinder liner 11 and in any other, the uncovering of exhaust ports causes the working pressure to drop. This in turn causes the pressure relief valve 31 to open and stay open throughout the exhaust stroke of the piston 30. The piston 30 travels on its way to top dead center and again covers the exhaust ports in the cylinder liners After leaving the low pressure cylinder, or cylinders, the working media exhausts either to the atmosphere, or to a conventional condenser as in a marine application.

Figure 2:
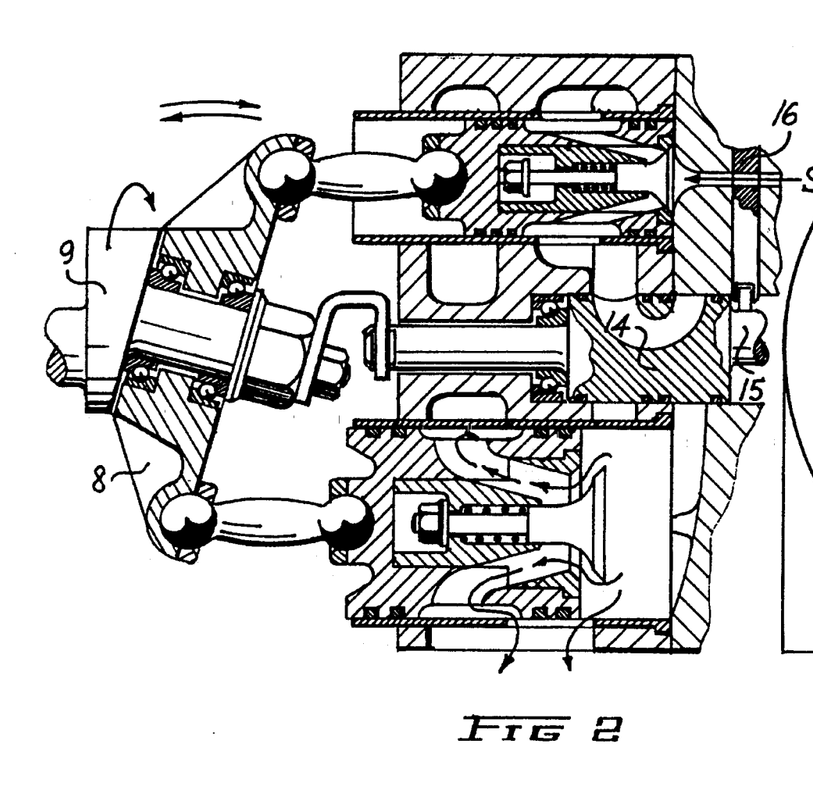
FIG. 2 is a fragmentary longitudinal cross-sectional view of FIG. 1 after a 180-degree turn of the crankshaft during normal operation, illustrating the exhaust stroke of the lower piston in the low pressure cylinder and the swash plate.
Figure 3:
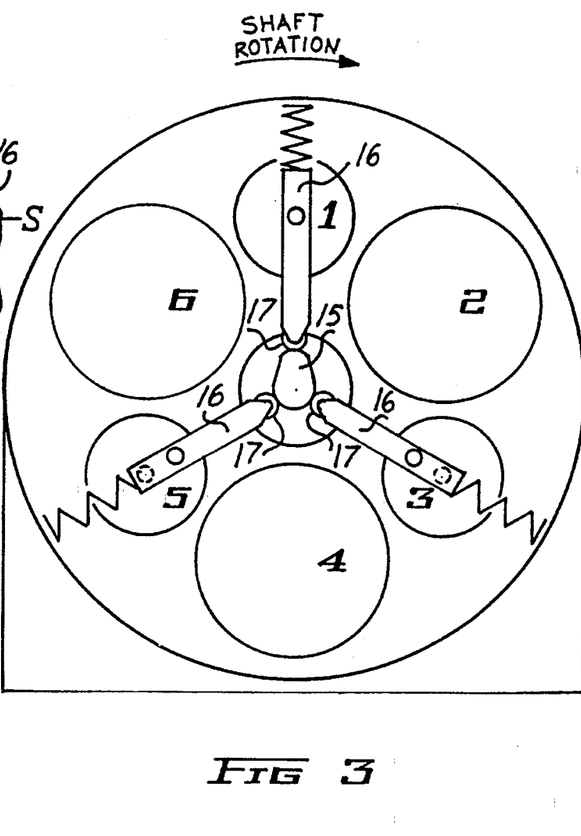
FIG. 3 is a high pressure steam distribution diagram of the six cylinder integrated steam motor of FIG. 1.

FIG. 3 represents a steam distribution diagram for a six-cylinder integrated steam motor with three high-pressure and three low-pressure cylinders. The concept of the present invention places no limit on the number of cylinders and no limit on their size. In FIG. 3, the smaller circles represent the high pressure cylinders and by their scale relate directly to FIG. 1 and to FIG. 2. The low pressure cylinders are represented by the larger circles. With reference to FIG. 2, FIG. 3 shows the steam starting valve 16, wide open corresponding for the introduction of steam to the high pressure cylinder 1. This corresponds to the position of the cam 15 in FIGS. 2 AND 3. The two other steam starting valves remain closed with respect to high pressure cylinders 3 and 5 until the high lobe of the cam 15 turns in the direction of the crankshaft rotation and pushes them open, one at a time, and at 120 degrees from each other.

Figure 4:
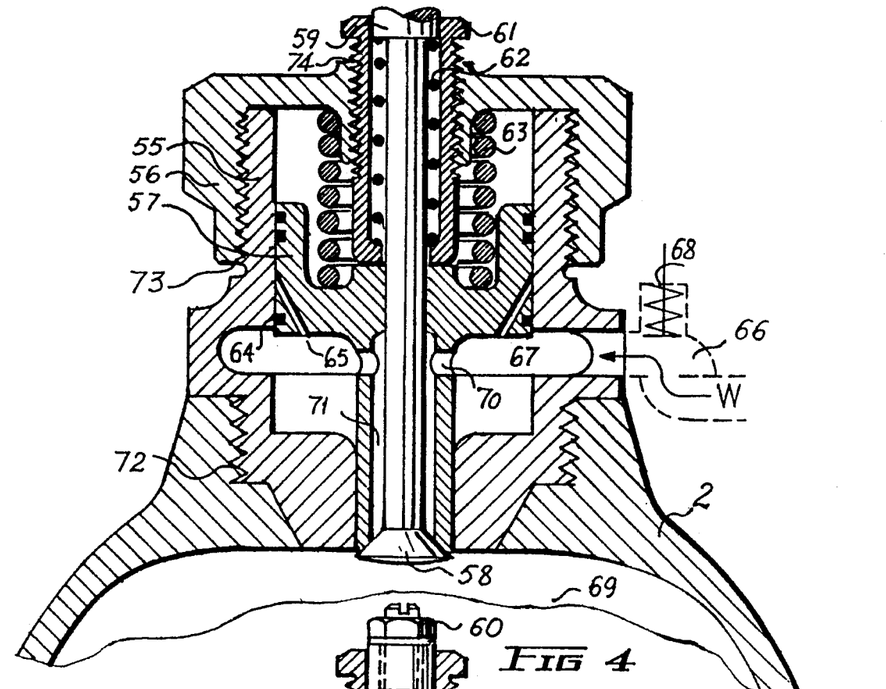
FIG. 4 is a longitudinal cross-sectional view of an automatic water injector shown on FIG. 1, enlarged and detailed for clarity of comprehension, shown at its suction stroke with the valve in a closed position.

FIG. 4 is a cross-sectional view of the automatic water injector of FIG. 1. It is enlarged and detailed for clarity of comprehension and is illustrated at its suction stroke. The suction stroke of the automatic water injector is the first of two principal strokes in the working process. Screwed into the torroidal pressure vessel 2 of FIG. 1 by means of one of the standard for high pressure gas connection threads 72, or somehow else effectively connected depending on size and materials used, is a body 55 of the automatic water injector. The water injector is precisely machined out of a high grade, high-tensile strength, non-corrosive metal piece. The water injector has cylindrical walls which house a piston 57. There is connected to the body 55, by means of thread 73, a cover-nut 56. The cover-nut has an important function of providing a pressure-tight cover for an assembly of precision moving components of the automatic water injector and also a means for regulating the length of the piston 57 stroke. Inside the piston 57 is a valve 58 which is normally closed by means of a spring 62. The tension of the spring 62 is adjusted by means of a sleeve 61 which is movable along its thread 74 which holds the sleeve 61 in the cover-nut 56. The tension on the spring 62 influences the opening and the closing of the valve 58 and the introduction of the expandable material such as water into the pressure vessel 2. Operated by a spring 63 responding to variations of steam pressure within the torroidal pressure vessel 2, the automatic water injector operates as follows:

The starting of a cold integrated steam motor of the present invention begins with firing of the conventional burner 4 of FIG. 1. A chosen fuel varying from a solid to a liquid to a gas may be used for combustion inside the furnace casing assembly 3. In the illustrated embodiment of the present invention, the water is kept away from the steam producing inside walls of the torroidal pressure vessel 2 until a desired temperature of these walls is reached. In other words, the temperature of the pressure vessel 2 is elevated to the desired temperature before water is introduced. Until the desired temperature is realized, the spring 63 of the automatic water injector will keep the piston 57 at the bottom of a cylindrical chamber 67. This prevents water entering into the chamber 67, even though the pressure of feed water is greater than resistance of a spring 68 inside a one-way valve 66. The valve can be a standard type valve, incorporated into the feed water line connected to the automatic water injector in a conventional manner. To further prevent the feed water from entering the torroidal pressure vessel 2 prematurely via passages 65, 70 and 71, there is an injection valve 58. The valve 58 is normally closed by a spring 62. This keeps the water inside the water injector, until a pressure greater than the strength of the spring 62 opens the injection valve 58.

Figure 12:
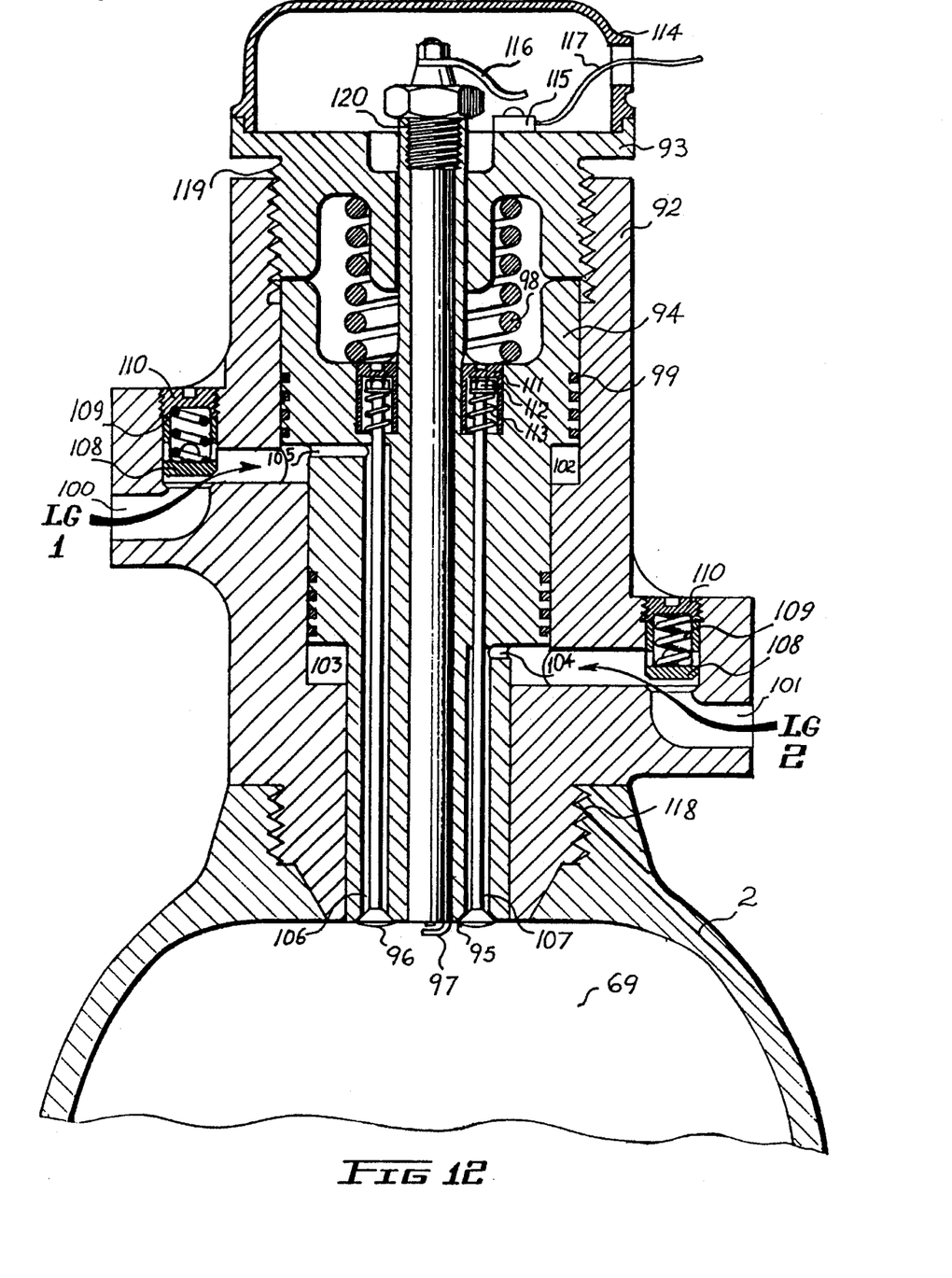
FIG. 12 is a fragmentary longitudinal cross-sectional view of an automatic hydrogen-oxygen mixture burner for the integratede steam motor of FIG. 1, shown on its suction stroke and, FIG. 13 is a fragmentary longitudinal cross-sectional view of an automatic hydrogen-oxygen mixture burner for the integrated steam motor of FIG. 1 shown on each injection stroke.
Figure 13:
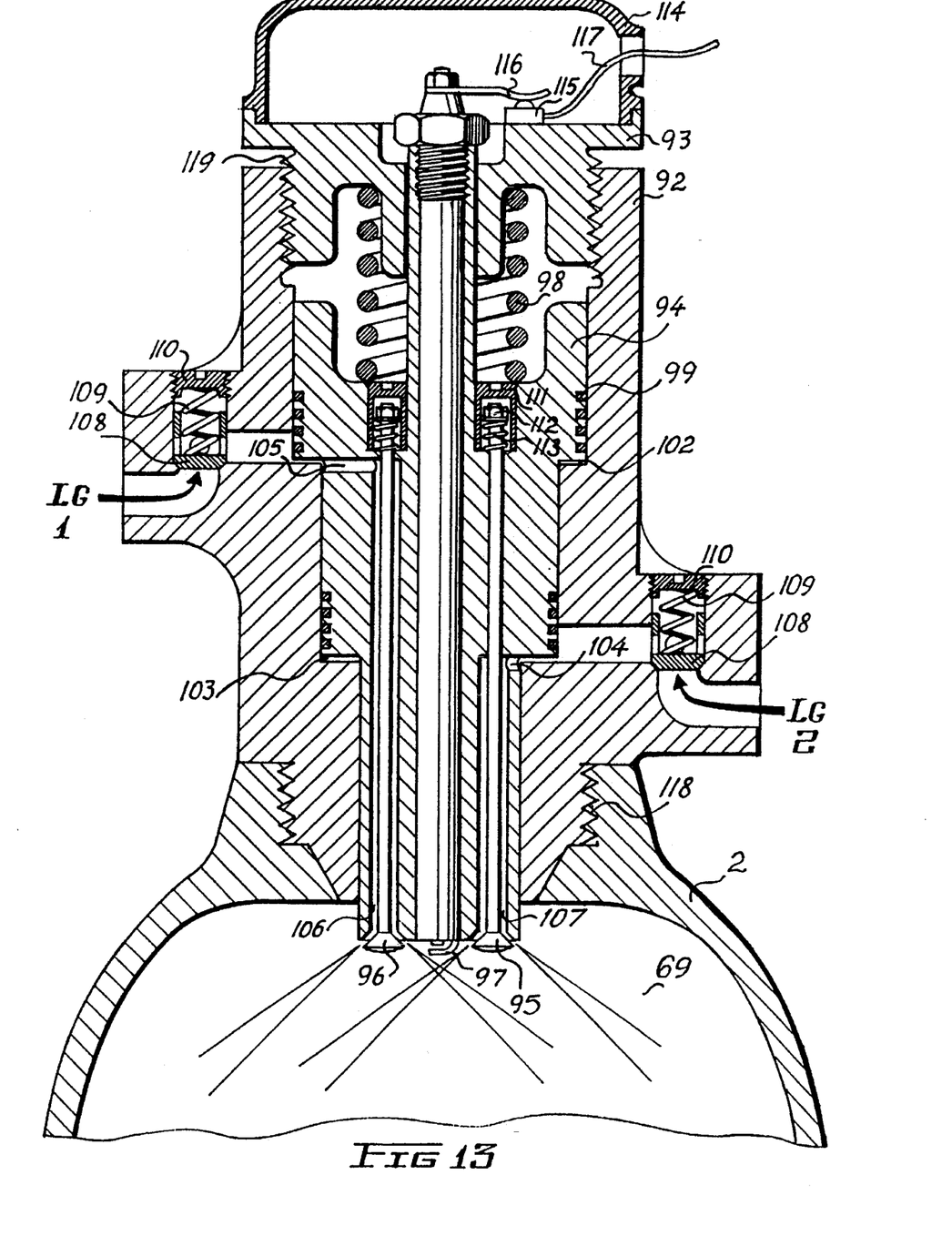

With respect to FIGS. 12 and 13, it is seen that a limited amount of two combustible materials, are independently and separately introduced into the pressure vessel 2 and chamber 69. As is well known, hydrogen and oxygen will burn or unite to form water and with a high temperature steam. The limited quantities of hydrogen and oxygen introduced into two commingle and a spark from electrode 16 and 97 ignites the hydrogen and oxygen to produce steam and a high pressure. The amount of hydrogen and oxygen which combust is relatively small so that there is a fast burning or explosion inside of the pressure vessel 2 with an increase in pressure. The valves 95 and 96 are closed so that no more hydrogen and oxygen can be introduced into the pressure vessel 2 until the next stroke. With the increase in pressure in pressure vessel 2 due to the steam, the steam is introduced into the first cylinder 11 or high pressure cylinder 11 to move the piston. This is a continual process, as hydrogen and oxygen are introduced into the pressure vessel 2 and ignite to produce steam with an increase in pressure, which drives the piston in the high pressure cylinder 2. This is in effect a pulsating effect. In effect, it is a controlled pulsation due to a build-up of steam pressure in the pressure vessel 2 and then the release of the steam pressure into the high pressure cylinder 11.

Figure 5:
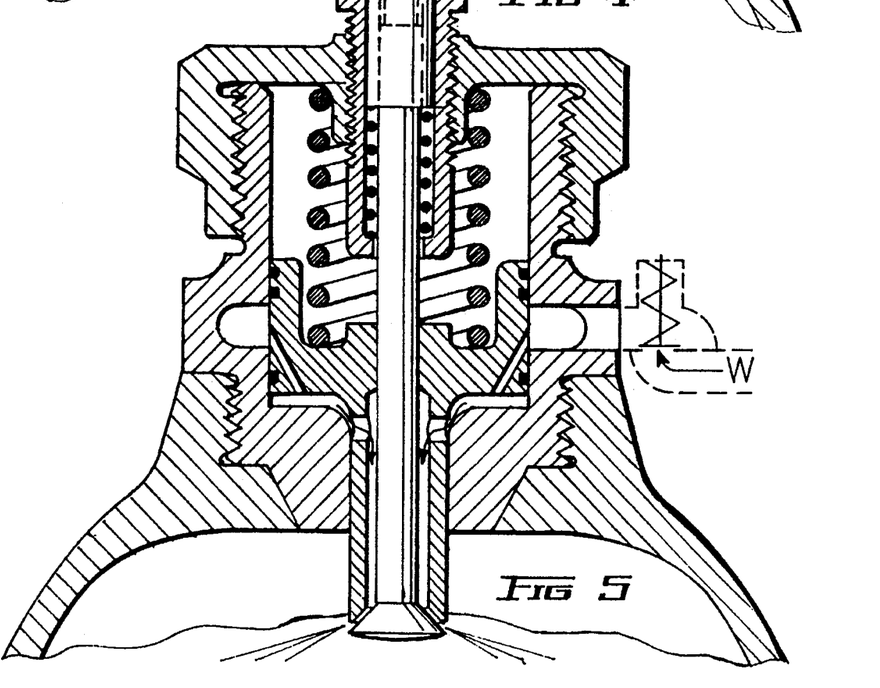
FIG. 5 is a longitudinal cross-sectional view of an automatic water injector illustrated in FIG. 4, this time with the valve on its water injection stroke and the valve being positioned away from the valve seat.

To start a steam-producing process inside the walls of the hot torroidal pressure vessel, an external upward force must be applied to the injection valve extension outside the automatic water injector. This upward force is necessary, for one stroke only. This single upward stroke of the piston 57 to its upper limit within the chamber is the starting stroke and is a suction stroke. This stroke can be initiated either manually or with the help of a conventional mechanical hydraulic, electrical apparatus, or combined device overpowering the tension of the spring 63. The spring 63 is designed to keep the piston 57 at the bottom position. This single suction stroke of the piston 57 to its upper position is limited by the sleeve 59. This stroke is initiated by an external force for a starter and sets the water injector in its automatic mode as follows. The movement of the piston 57 creates a vacuum below it. This vacuum is broken by the feed water waiting for that moment to open the one-way valve 66. The valve 66 is normally closed until the pressure differential in the feed water line forces it to open. Once the water admission onto the chamber below the piston is complete, there is no need for the external force which was required for this single starting moment. The first suction stroke is no longer needed until there is a need to stop the steam generating process. In other words to stop the motor. From this moment on, the springs 62 and 63 of the automatic water injector and the opposing pressure fluctuation inside the torroidal pressure vessel 2 will control the injecting of the desired amount of water on-demand into the torroidal pressure vessel in a rhythm compatible with working cycles of the motor. From the position of the piston 57 of FIG. 4, at its utmost top position where it was brought initially by the external force of an operator's hand, or an apparatus operated from a remote control, the piston 57 is forced by the spring 63 to move downwardly to another utmost position as shown in FIG. 5. As soon as the piston 57 on its way down creates the pressure on the water below it, which instantly becomes greater than the feed water pressure in the feed water supply line, the one-way valve 66 shuts. This traps the water in the chamber 67 below the piston with no place to go except through the passages 70 and 71 towards the injection valve 58. The valve 58 is forced open, making the injection stroke complete. Remember, the valve 68 is closed and the path of least resistance is through the passages 70 and 71 and past the valve 58 and into the space 69 of the pressure vessel 2. The valve assumes the position illustrated in FIG. 5. With the injection of water into the hot torroidal pressure vessel, steam is instantly generated creating the needed pressure to move the piston 57 up with an increase in the steam pressure in the space 69, the injection valve 58 closes. The piston 57 is pushed to its upper limit by steam pressure and into another suction stroke. This is accomplished automatically by the pressure of steam inside the chamber 69 which for the moment is greater than the pressure of the spring 63 and assumes the position illustrated in FIG. 4. Again, the feed water under pressure in the feed water line opens the one-way valve 66 to respond to vacuum created under the piston to fill the space below the rapidly moving upwards piston 57. At the very beginning of the suction stroke, when the body of the piston itself has not yet uncovered the feed water circular chamber 67 around it, the feed water "breaks in" via passages 65 in the piston 57 as illustrated. In another instant, the piston uncovers the circular chamber 67 where more feed water is waiting. The suction is complete with the piston 57 reaching its upper limit and the feed water occupying the entire space below the piston. A short time later the pressure of the working media (steam) in the torroidal pressure vessel 2 drops due to its use in the working cylinders 11 and 12 of the motor. This pressure drop is awaited by the spring 63 ready to repeat the injection stroke by pushing the piston 57 down and the water below it out into the steam generating pressure vessel 2. This is a repeating process with water being introduced into the pressure vessel 2 to form steam and to increase the steam pressure inside the vessel to close the valve 58. The steam pressure drops with the opening of the valve 16 introducing steam to the high pressure cylinder 11. With water already in the chamber 67, the spring 63 moves the piston 57 downwardly and the reduced steam pressure allows the valve 58 to open, introducing water into the vessel 2. And so continuously and automatically, (in other words, independently from external forces of an operator's hand or his tools), the piston 57, (responding to the pressure of its spring 63, in its injection movement downwards and to the overpowering pressure inside the steam generating vessel which follows afterward to push the piston into its suction stroke), accomplishes its task of producing working media (steam) according to the demand of the working cylinders of the integrated steam motor.

Among other components of the automatic water injector assembly requiring explanation are: a plurality of seal rings 64, which assure a compression under the piston; a sleeve 59, which regulates the tension of the spring 62; and, a nut 60, which secures the sleeve 59 on the stem of the injection valve 58 in the position relative to a desired spring adjustment. The volume of water injected into the steam generating vessel 2 is adjustable by screwing in or screwing out the sleeve which regulates the length of the piston's stroke. The frequency of these strokes is also adjustable by, similarly, turning the covernut clockwise or counter-clockwise along its thread 73 relative to the body 55, which tightens or loosens the tension of the spring 63. Once the automatic water injector is set for a desired speed of the integrated steam motor, provided that the burner maintains a desired temperature on the torroidal pressure vessel 2, the water injector will also perform as a speed governor in the following manner: For example, if a load on the output shaft of the motor is increased (sudden increase in electrical power consumption supplied by the generator driven by an integrated steam motor, etc.), the load would tend to slow down the motor. But the slowing down of the output shaft 9 would slow down the rotation of the steam distributor connected to it, which, in its turn, prolongs the opening time of the high pressure steam starting valve 16 of FIG. This admits more high pressure steam into the high pressure cylinder in an attempt to meet the demand and maintain the original speed. Similarly, with a decrease of the load at the end of the output shaft, the motor would tend to increase its speed. This increase in speed would shorten the opening time of the high pressure steam starting valve 16. As the result, less steam will be admitted into the cylinder causing a slow-down adjustment towards the original speed. For emergency stops of the motor, the mentioned before external force of an operator's hand or of a tool applied to bring the piston 57 to its upper-most position against the spring 63 and its stroke limiting sleeve 61, to stop the automatic water injection cycle would be needed. For normal shutdown of the motor, the turning off of the fuel burner is sufficient.

Figure 6:
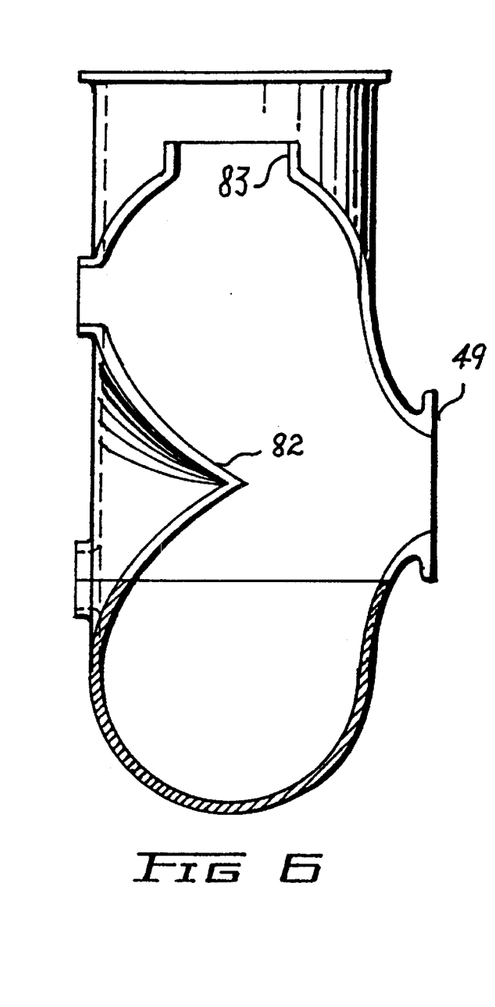
FIG. 6 is a fragmentary cross-sectional view of a furnace casing assembly of the integrated steam motor of FIG. 1.

With reference to FIG. 6, showing an embodiment of the furnace casing assembly of FIG. 1, it is seen that it is cross-sectioned similarly to the FIG. 1 presentation line. The flange 49 serves a means for gas-tight mechanical connection of a conventional fuel burner apparatus to an integrated steam motor of the present invention. In case of use of the automatic hydrogen-oxygen mixture burning inside of the torroidal pressure vessel, the flange 49 is either left open (no need for an external burner anymore), or a cooling fan is connected to it of a conventional type, drawing the outside air above the exhaust outlet of the furnace down into the furnace to cool the torroidal pressure vessel, if needed, and bringing now warm, or even hot air in for any needs which may arise, depending on the application of the integrated steam motor. A collar 83 provides a gas-tight mechanical connection between the furnace casing and either the automatic water injector or the automatic hydrogen-oxygen mixture burner screwed into the torroidal pressure vessel having one adaptor opening suitable for either one. A diffuser 82 is an integral part of the furnace casing and serves to direct the incoming heat flow from the burner to the torroidal pressure vessel in the most efficient manner.

Figure 7:
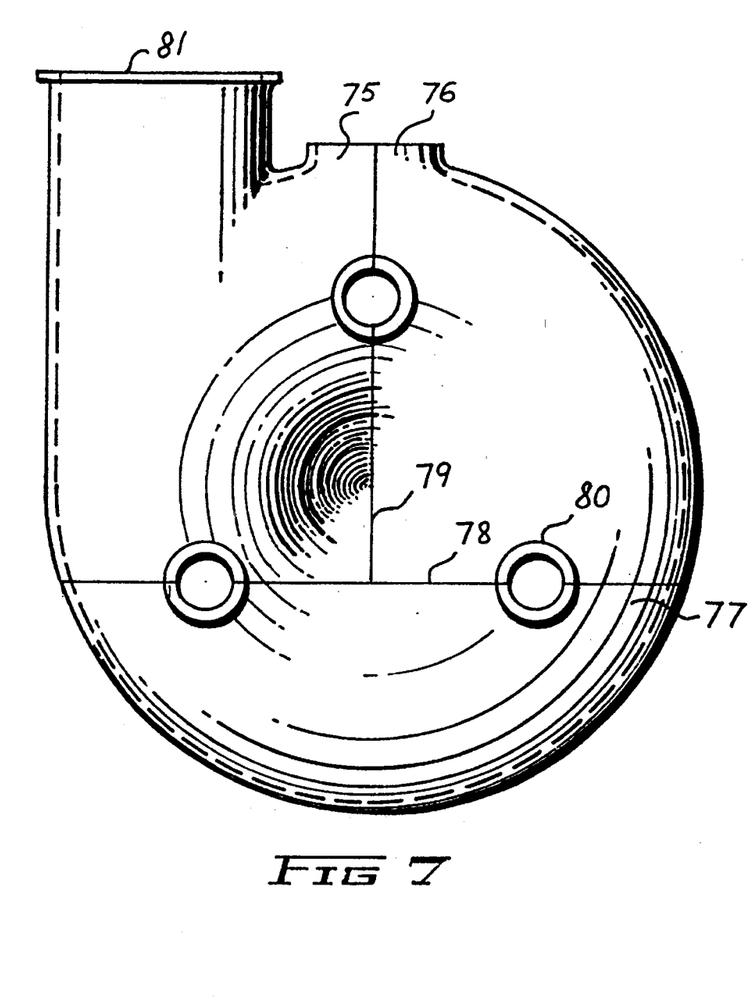
FIG. 7 is a lateral cross-sectional view of an elevational view of the furnace assembly of FIG. 6.

The back side elevation of the furnace casing assembly represented in FIG. 7 shows three principal components of the furnace casing assembly: left side 75, right side 76 and a lower side 77—gas-tight and mechanically connected to each other along joint lines 78 and 79. Flanges 80, the plurality of which would depend on a particular configuration, design or embodiment of the present invention, provide a gas-tight, mechanical connection between the furnace casing assembly and torroidal pressure vessel. A flange 81 serves the purpose of adopting the furnace assembly to an exhaust system. The design may differ from one application to another of an integrated steam motor of the present invention, dependent on different needs and requirements.

Figure 8:
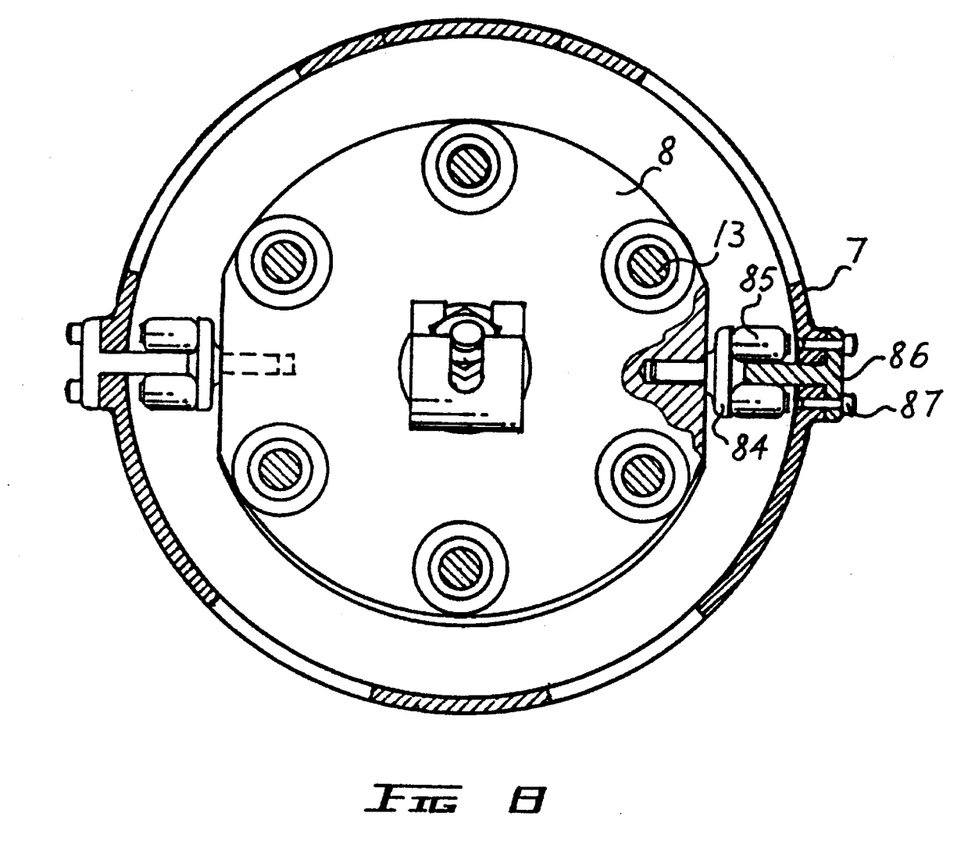
FIG. 8 is a swash plate guidance arrangement employed in FIG. 1.

With reference now to FIG. 8 showing the swash plate guidance arrangement employed in FIG. 1: To make the swash plate 8 wobble instead of rotating so as to force the crankshaft 9 to rotate, a pair of forks 84 are embedded into the swash plate at the diametrically opposite points. These forks are free to turn around their pins sitting in the swash plate as shown. The forks 84 carry a couple of spaced-apart rollers 85. Each of the rollers 85 are free to turn on their pins on standard ball bearings for minimum friction. The rollers are striding over and riding along the flat surfaces of guides 86 mechanically secured in their slots by standard fasteners 87 firmly connecting them to the crankcase 7 of FIG. 1. Aside from the above-mentioned purpose for incorporating this guidance arrangement into the present embodiment of the integrated steam motor, it also eliminates undue twisting moments in the sockets of the connecting rods 13 and inserting their pressure on the swash plate during normal operation of the motor.

Figure 9:
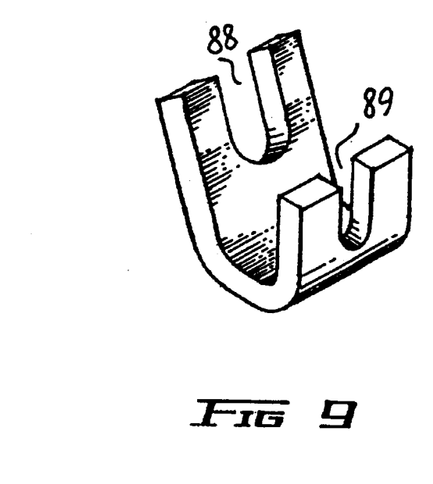
FIG. 9 is a connector piece for steam distributor of FIG. 1 and for connecting the crankshaft to the steam distributor.

On FIG. 9, there is shown a solid metal, or otherwise hard drive connector piece for the steam distributor 14 of FIG. 1, having a slot 88 for connection the crankshaft 9, to which it is secured by the nut 23 of FIG. 1. There is another slot 89 riding over the corresponding-in-size flats at the end of the steam distributor 14, also with the reference to FIG. 1. This simple device provides a precise timing of the high pressure steam starting valves.

Figure 10:
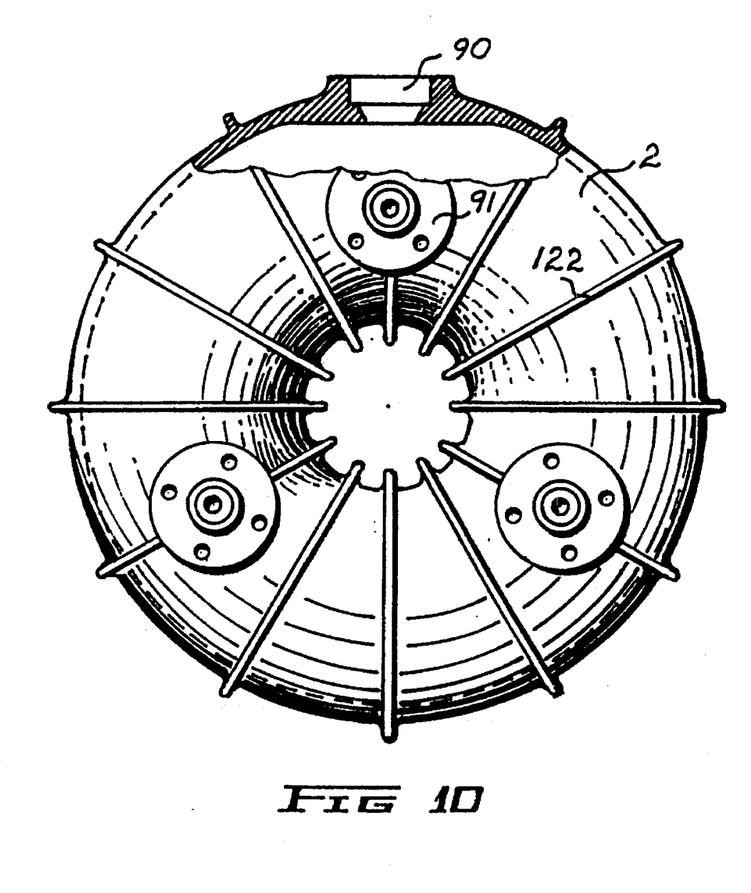
FIG. 10 is a fragmentary lateral cross-sectional elevational view of the torroidal pressure vessel of FIG. 1.

FIG. 10 shows a partially sectioned elevational view of the torroidal pressure vessel 2 of FIG. 1. This high pressure and high temperature resistant vessel is a one-piece solid unit integrated with a plurality of flanges 91 for a gas pressure-tight connection by mechanical means to the cylinder head block 5 of FIG. 1. There is a plurality of heat-retaining (in case of usage of an external conventional fuel burner) or heat-dissipating (in case of usage of the internal combustion provided by the automatic hydrogen-oxygen mixture burner) ribs 122. There is an adapter 90 suitable for either an automatic water injector or an automatic hydrogen-oxygen mixture burner. Dependent on the size and application of an integrated steam motor of the present invention, there may arise a need for one or more automatic water injectors working together with the automatic hydrogen-oxygen mixture burner. In that case, there should be an extra number of the adapters 90 incorporated into the torroidal pressure vessel at the points where the automatic water injectors would be most efficient performers relative to the hydrogen-oxygen mixture burner and the high pressure steam starting valves.

Figure 11:
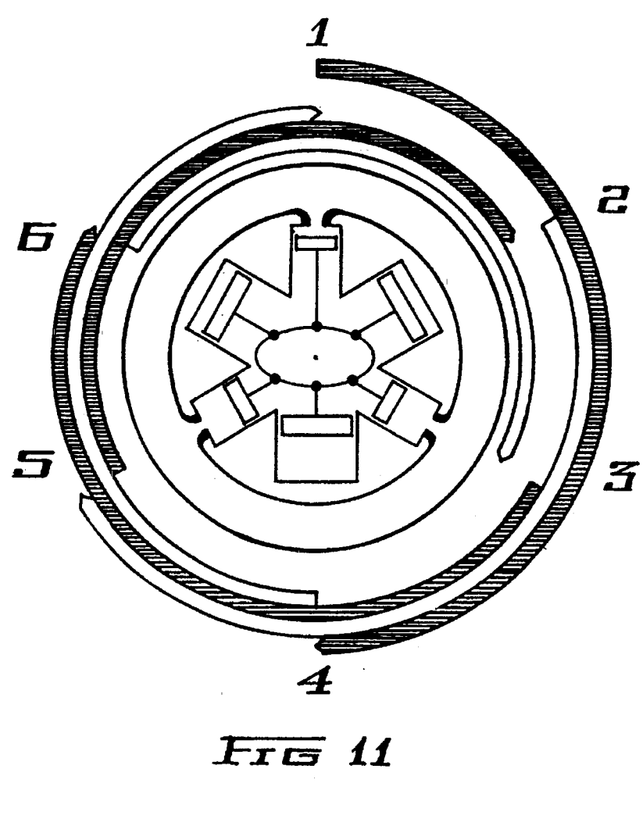
FIG. 11 is a power stroke overlapping diagram for the six cylinder integrated steam motor of FIG. 1.

On FIG. 11, there is shown a power stroke overlapping diagram to demonstrate an exceptional smoothness of operation of an integrated steam motor of the present invention in a six-cylinder embodiment. The tinted arrows represent the high pressure strokes while the blank arrows represent the low pressure strokes. Each colour relates to three cylinders for high pressure and low pressure steam and therefore, totalling six. As it could easily be seen, each power stroke drives the output shaft for a 180-degree turn with exactly the same turning moment all the way through (as compared to a conventional design of internal combustion engine in which a maximum turning point is achieved only when the connecting rod is passing through the 90-degree angle relative to the crankshaft) even though, in a two-stroke internal combustion engine, the power stroke does extend through a 180-degree of the output shaft. Furthermore, in the six-cylinder embodiment of the present invention, as is obvious from FIG. 11, after every 60-degree of the power output shaft's rotation, another cylinder begins its power stroke. Therefore, at every given moment of operation of this six-cylinder embodiment of the integrated steam motor, three, or exactly half of all the cylinders, are producing work with vibration-free smoothness, which is impossible to achieve with a six-cylinder internal combustion engine. If an attempt to be made to somehow duplicate the smoothness of a six-cylinder integrated steam motor operation, at all costs, using a conventional design approach to internal combustion engine, that engine would have to have a triple number of cylinders with 18 crankpins on its crankshaft with 60 degrees only between them. There would be a prohibitive weight of the moving parts, especially the crankshaft itself, representing an engine of unacceptable inefficiency. In a V-ee or a W-configuration, such an engine may be less bulkier than an in-line configuration of such an attempt, but with higher production costs and without much gain in the mechanical efficiency.

With reference to FIG. 12, there is shown in cross-section an embodiment of an automatic hydrogen-oxygen mixture burner; in essence, an auto-gas burner. In this first introductory drawing of this high-precision, simple and highly reliable apparatus, designed specifically for the integrated steam motor of this invention, the auto-gas burner is presented with its principal component, such as a two-stage piston 94 pushed by an unspecified force to its upper limit, which is the end of a suction stroke. The reason for showing a two-stage piston 94 in this position is that it is the beginning of a completely independent automatic cycle of operation of this novel apparatus (except for an electric power source, like a battery, required for the initial ignition). The starting pressure, which overpowered a strong, calibrated spring 98, comes from two or more principal sources equally effective for the purpose of starting an integrated steam motor of the present invention equipped with an auto-gas-burner. The first source is compressed air, widely used in many industrial application for the starting of internal combustion engines by means of direct injection of high pressure air via starting valves into the cylinders according to a firing order. The second source is a means of compact-air starting motors resembling in shape electric starters acting upon toothed flywheels. To use high pressure air for starting this embodiment of the present invention, a third stage, (above the two stages of the piston 94 needed for two different gases) must be added to this design of the auto-gas-burner. I decided to postpone discussing the third stage so as to discuss the second source of starting pressure for driving the piston 94 to its automatic cycle's beginning. This pressure comes from an external action by an operator pushing a single remote control button. Consider that the normal position of the piston, with the engine in STOP position, is at the bottom of its two cylinders. This means that once the shut-off valves on the storage tanks of LG 1 and LG 2 (Liquified gas 1 and 2, abbreviated for simplicity) are open, their gas pressure will lift the one-way valves 108 at the entrance openings 100 and 101. Immediately thereafter, the gas pressures will lift injection valves 95 and 96. At this stage, only a spark from a sparkplug 97 is needed to start combustion of the flammable gaseous mixture. Therefore, while preserving the simplicity of the original design of the auto-gas-burner, I preferred a simplified starting method, comprising a conventional electric battery, a couple of off-the-shelf solenoid valves, a common push-button and some electric wire combined into a simple starting scheme producing simultaneously the opening of the two LG storage tanks and a spark for the ignition at the push of a button. After that instant action, the auto-gas-burner is at FIG. 12 position of its piston 94 and will run automatically until an operator shuts off the flow of gas from the LG storage tanks and the source of ignition. The speed and power output of an integrated steam motor running on the internal combustion of a gas mixture using this embodiment of the auto-gas-burner depends on the length of the piston 94's stroke. In this case, adjustment is made by moving a covernut 93 either up (to lengthen the stroke of the piston 94), or down (to decrease the stroke of the piston 94) along its threaded connection 119 to the body 92. Normally, at the end of the suction stroke, the pressure of LG1 and LG2 inside respective cylindrical chambers 102 and 103 is equal to the respective gas supply pressures. The identical one-way valves 108 operated by springs 109 below regulating plugs 110 would be closed. However, in FIG. 12, the valves 108 are shown open as if the suction stroke is not complete. Once both gases are forced into their respective chambers, they continue filling bores 104 and 105 as well as canals 106 and 107 leading to the normally closed injection valves 95 and 96. These identical injection valves 95 and 96 are kept closed by means of springs 113. The springs 113 are secured in their positions by nuts 112 and enclosed and threaded into the piston's body sleeves 111. The piston 94 is precision-fit to the inner surfaces of the body 92 along which it slides up and down. Also, it has a plurality of grooves to accommodate the or seal rings 99 for assured compression and to prevent gas leaks in the wrong direction. The body 92 of the auto-gas-burner is screwed into the adaptor socket of the torroidal pressure vessel 2 by means of threaded connection 118 compatible with the threaded connection 72 of FIG. 4 so as to be totally interchangeable with the auto-water-injector assembly 1 in relation to the torroidal pressure vessel 2. Methods of connection of those apparatus may differ from one commonly used for a high pressure and temperature applications to another depending on the size and other characteristics of an embodiment of the present invention being designed for production. When a working pressure in a space 69 of the torroidal pressure vessel 2 pushes the piston up to its uppermost limit set by the regulating covernut 93, a spring-contact 116 of a sparkplug 97, screwed into the piston by means of threaded connection 120, is lifted off an electrical supply contact 115 Contact 115 is connected to an external source of electricity by a wire 117. This simple, foolproof electrical arrangement is protected from elements by a cover 114, fitted to the top of the regulating covernut 93 by conventional fastening means. The commonly simple and reliable one-way valve 108, of which there are two identical ones, is fitted into a bore. The valve 108 slides up and down in the bore a quarter of its diameter, so as to be wide open or closed between the limits of its seat below and a screw-type sealing plug 110 above. It responds to its own spring 109 tension (during the compression stroke, here called the injection stroke) and to a gas pressure during the suction stroke.

The injection stroke, depicted in FIG. 13, begins instantly with a drop of pressure inside the torroidal pressure vessel 2 and below the calibrated value of the spring 98. Following the equalization of the pressure at the end of the suction stroke between the gas supply pressures (both LG1 and LG2) and the pressure inside respective chambers 102 and 103 just filled with gas inside the auto-gas-burner below its piston's stages, the one-way valves 108 at the gas entrances are closed by their springs 109. The gas, now trapped inside, has only one way to go, specifically, to the seats of respective injection valves 95 and 96 to force them open for injection and mixture. At the same time, the ignition takes place by means of the sparkplug contacting the power supply point at the instance the piston 94 is pushed down.

The integrated steam motor is also useful for slow-speed applications. The use of the auto-gas-burner in large, slow-speed marine or stationary power plant applications should be combined with the automatic water injectors for a better economy performance. The integrated steam motor operating only on a hydrogen-oxygen mixture can be used in high performance aircraft or automotive engines. Remember that the temperatures of 4,500 Degrees Fahrenheit and pressures in the 1,000 pounds per square inch region are common to the burning of the hydrogen-oxygen mixture. An extra water injection into such a high temperature environment brings a cooling effect combined with the generation of more steam. This reduces or eliminates a need for an external cooling of the torroidal pressure vessel. Most modern sea carriers achieve their 25–30 knot speed by turning their propellers around 100 revolutions per minute. The engine for turning the propeller is usually a heavy, bulky, noisy, shaky and inefficient internal combustion engine, such as diesel. The percentage of the steam or gas turbine-driven deep sea carriers remains small. A marine version of the integrated steam motor using the auto-gas-burner with the auto-water-injectors combination may prove to be ideal in many respects. One of these is a direct reversibility of the integrated steam motor provided by a simpler and more reliable means than in the direct-reversible two-stroke slow-speed marine diesels connected directly to propeller shafts without reduction gears. In terms of so-called "firing order" definition associated with the internal combustion engine terminology, the integrated steam motor of the present invention does not have a firing order. Its output is independent of the direction of rotation of its crankshaft. The direction of rotation is pre-determined by a starting motor of a conventional type. The starting motor may be electrical, hydraulic, pneumatic or else. The starting motor is geared to the flywheel and activated by an operator simultaneously with the admission of the pressurized working media into the cylinders. A complete stop of the flywheel is required for the direct reversing of the integrated steam motor. By reversing the rotation of a starting motor, the flywheel is forced to rotate in the opposite direction while steam admission is stopped for that moment. The steam admission again opened as soon as the motor begins its rotation in reverse direction.

In order to produce steam as result of complete combustion of hydrogen and oxygen, these gases have to be mixed in a one to eight ratio by weight; as it is well known to students of chemistry. Therefore, referring to FIGS. 12 and 13, chambers 102 and 103 would have to have volume ratio accordingly.

What I claim as my invention is:

1. A process for converting a rectilinear movement to a rotary movement, said process comprising:
   a. igniting a first combustible material and a second combustible material in an exothermic reaction to produce heat energy;
   b. introducing an expandable material to said heat energy to form a vapor of said expandable material;
   c. utilizing said vapor of said expandable material to said first piston to move said first piston in said rectilinear path and to produce a first exhaust vapor;
   d. utilizing said first exhaust vapor to move a second piston in a rectilinear path to move a swash plate for rotating a crankshaft;
   e. utilizing the pressure of said vapor to control the flow of said first combustible material and said second combustible material; and,
   f. utilizing the pressure of said vapor of said expandable material to control the flow of said expandable material.

2. An engine having a rotary output shaft and comprising:
   a. a combustion chamber;
   b. a first means for introducing a first combustible material into said combustion chamber;
   c. a second means for introducing a second combustible material into said combustion chamber for reacting with said first combustible material in an exothermic reaction to give off heat energy;
   d. a first cylinder;
   e. a first piston in said first cylinder for rectilinear movement in said first cylinder;
   f. an expandable material;
   g. a third means for contacting said expandable material with said heat energy to form a vapor;
   h. a fourth means for introducing said vapor into said first cylinder for moving said first piston in a rectilinear path in said first cylinder;
   i. a swash plate;

j. a first connecting rod operatively connecting said first piston with said swash plate;

k. said swash plate operatively connecting with a rotary output shaft;

l. said swash plate converts the rectilinear movement of said first piston to a rotary motion of the rotary output shaft;

m. a first meter for controlling the introduction of said expandable material;

n. said first meter comprising a first chamber;

o. a fifth means to control the flow of said expandable material in the form of a liquid into said first chamber;

p. a second cylinder in said fifth means and in contact with said first chamber;

q. a second piston in said second cylinder;

r. a first passage in said second piston and operatively connecting with said first chamber;

s. a first valve operatively connecting with said first passage to control the flow of said expandable material through said first passage;

t. a sixth means in response to a change in pressure to move the first valve with respect to said first passage and said second piston to control the flow of said expandable material; and, u. a seventh means in response to a change in pressure to move said second piston in said second cylinder to control the flow of said expandable material into said first chamber.

3. An engine having a rotary output shaft according to claim 2 and comprising:

a. an eighth means operatively connecting with said first chamber to control the flow of said expandable material to said first chamber.

4. An engine having a rotary output shaft and comprising:

a. a combustion chamber;

b. a first means for introducing a first combustible material into said combustion chamber;

c. a second means for introducing a second combustible material into said combustion chamber for reacting with said first combustible material in an exothermic reaction to give off heat energy;

d. a first cylinder;

e. a first piston in said first cylinder for rectilinear movement in said first cylinder;

f. an expandable material;

g. a third means for contacting said expandable material with said heat energy to form a vapor;

h. fourth means for introducing said vapor into said first cylinder for moving said first piston in a rectilinear path in said first cylinder;

i. a swash plate;

j. a first connecting rod operatively connecting said first piston with said swash plate;

k. said swash plate operatively connecting with a rotary output shaft;

l. said swash plate converts the rectilinear movement of said first piston to a rotary motion of the rotary output shaft;

m. a first meter for controlling the introduction of said first combustible material;

n. a second meter for controlling the introduction of said second combustible material;

o. said first meter having a first chamber;

p. a moveable piston in said first chamber;

q. a first valve in said first chamber;

r. a fifth means in response to a change in pressure to move said moveable piston to preclude the flow of said first combustible material to said first chamber;

s. a sixth means in response to a change in pressure to move said first valve to allow said first combustible material to leave said first chamber;

t. said second meter having a second chamber;

u. a moveable piston in said second chamber;

v. a second valve in said second chamber;

w. a seventh means in response to a change in pressure to move said moveable piston to preclude the flow of said second combustible material to said second chamber; and, x. an eighth means in response to a change in pressure to move said second valve to allow said second combustible material to leave said second chamber.

5. An engine having a rotary output shaft according to claim 4 and comprising:

a. a metering means in response to a change in pressure controlling the flow of said first combustible material to said first chamber; and, b. a metering means in response to a change in pressure controlling the flow of said second combustible material to said second chamber.

6. An engine having a rotary output shaft according to claim 4 and comprising:

a. a body; and, b. said first meter, said second meter, said first chamber, said second chamber, said first valve, said second valve, said moveable piston, a means in response to a change in pressure to move said moveable piston, said fourth means and said fifth means being in said body.

7. An engine having a rotary output shaft according to claim 4 and comprising:

a. a third meter for controlling the introduction of said expandable material;

b. said third meter comprising a third chamber;

c. a ninth means for controlling the flow of said expandable material in the form of a liquid into said third chamber;

d. a second cylinder in said third meter and in contact with said third chamber;

e. a second piston in said second cylinder;

f. a first passage in said second piston and operatively connecting with said third chamber;

g. a third valve operatively connecting with said first passage to control the flow of said expandable material through said first passage;

h. a tenth means in response to a change in pressure to move the third valve with respect to said first passage and said second piston to control the flow of said expandable material; and, i. an eleventh means in response to a change in pressure to move said second piston in said second cylinder to control the flow of said expandable material into said third chamber.

8. An engine having a rotary output shaft according to claim 7 and comprising:

a. a metering means in response to a change in pressure controlling the flow of said first combustible material to said first chamber; and, b. a metering means in response to a change in pressure controlling the flow of said second combustible material to said second chamber.

9. An engine having a rotary output shaft according to claim 8 and comprising:
   a. a third cylinder;
   b. a third piston in said third cylinder for rectilinear movement in said second cylinder;
   c. a twelfth means for conveying said vapor from said first cylinder into said third cylinder for moving said second piston in a rectilinear path in said third cylinder;
   d. a second connecting rod operatively connecting said third piston with said swash plate;
   e. said swash plate converts the rectilinear movement of said third piston to the rotary motion of said rotary output shaft; and,
   f. a thirteenth means for allowing said vapor to leave said third cylinder.

10. An engine having a rotary output shaft according to claim 7 and comprising:
    a. said tenth means being a spring;
    b. said eleventh means being a spring;
    c. a twelfth means for regulating the stroke of said second piston; and,
    d. a thirteenth means for adjusting the tension on said tenth means for influencing the opening and the closing of said third valve and the flow of said expandable material from said third meter.

11. An engine having a rotary output shaft according to claim 10 and comprising:
    a. a third cylinder;
    b. a third piston in said third cylinder for rectilinear movement in said second cylinder;
    c. a fourteenth means for conveying said vapor from said first cylinder into said third cylinder for moving said second piston in a rectilinear path in said third cylinder;
    d. a second connecting rod operatively connecting said third piston with said swash plate;
    e. said swash plate converts the rectilinear movement of said third piston to the rotary motion of said rotary output shaft; and,
    f. a fifteenth means for allowing said vapor to leave said third cylinder.

12. An engine having a rotary output shaft and comprising:
    a. combustion chamber;
    b. a first means for introducing a first combustible material into said combustion chamber;
    c. a second means for introducing a second combustible material into said combustion chamber for reacting with said first combustible material in an exothermic reaction to give off heat energy;
    d. a first cylinder;
    e. a first piston in said first cylinder for rectilinear movement in said first cylinder;
    f. an expandable material;
    g. a third means for contacting said expandable material with said heat energy to form a vapor;
    h. a fourth means for introducing said vapor into said first cylinder for moving said first piston in a rectilinear path in said first cylinder;
    i. a swash plate;
    j. a first connecting rod operatively connecting said first piston with said swash plate;
    k. said swash plate operatively connecting with a rotary output shaft;.
    l. said swash plate converts the rectilinear movement of said first piston to a rotary motion of the rotary output shaft;
    m. a pressure vessel;
    n. said pressure vessel and said combustion chamber being in an operating relationship for the transfer of heat energy from the combustion chamber to the pressure vessel;
    o. fifth means for introducing said expandable material into said pressure vessel;
    p. said fifth means being a first meter for controlling the introduction of said expandable material into said pressure vessel;
    q. said first meter comprising a first chamber;
    r. a sixth means for controlling the flow of said expandable material in the form of a liquid into said first chamber;
    s. a second cylinder in said fifth means and in contact with said first chamber;
    t. a second piston in said second cylinder;
    u. a first passage in said second piston and operatively connecting with said first chamber;
    v. a first valve operatively connecting with said first passage to control the flow of said expandable material through said first passage;
    w. a seventh means in response to a change in pressure to move the first valve with respect to said first passage and said second piston to control the flow of said expandable material; and,
    x. an eighth means in response to a change in pressure to move said second piston in said second cylinder to control the flow of said expandable material into said first chamber.

13. An engine having a rotary output shaft according to claim 12 and comprising:
    a. said seventh means being a spring;
    b. said eighth means being a spring;
    c. a ninth means for regulating the stroke of said second; and,
    d. a tenth means for adjusting the tension on said sixth means for influencing the opening and the closing of said first valve and the flow of said expandable material from said fourth means.

14. In combination,
    a. an integrated steam motor with a stator having a plurality of cylinder liners inserted into a common revolver barrel-like block inside which heat energy is converted into mechanical energy by the formation of a vapor identified as a working medium exerting pressure on sliding pistons inside of said cylinder liners and said pistons connecting with a crankshaft with a single crankpin by means of connecting rods and a swashplate;
    b. said crankshaft provided with bearings for rotation inside said stator;
    c. said pistons being of a plurality of sizes corresponding to their relation to a number of expansions of a working media inside said cylinder liners;
    d. a distributor for said working media and operatively connecting with said cylinders and said pistons;

e. a toroidal pressure vessel attached directly to said stator to provide said working media under pressure to said pistons and to said cylinders according to a timing provided by said distributor;

f. said distributor solidly connected to said crankshaft to provide a precise follow-up drive for said distributor of said working media under pressure to said cylinders and to said pistons;

g. said distributor being turned by said crankshaft operating a plurality of said working media under pressure admission valves as means of admission of said media to said cylinders and to said pistons;

h. said toroidal pressure vessel being capable of producing a flash steam when heated by a fuel burner externally to said toroidal pressure vessel while water is being injected internally into said toroidal vessel;

i. a furnace case around said toroidal pressure vessel being equally useful for the containing of burnt hot gases and directing the burnt hot gases into an exhaust system and for containing and directing a flow of cooling air around said toroidal pressure vessel when heating for steam generation is achieved by burning a gas mixture inside said toroidal pressure vessel to form said vapor identified as said working medium;

j. said furnace case being adaptable to conventional burners for a variety of gaseous, liquid and solid-liquified fuels;

k. said toroidal pressure vessel being adaptable for steam generation by igniting and burning internally in said toroidal pressure vessel such mixtures as hydrogen and oxygen for producing steam as a product of said hydrogen and oxygen combustion identified as said vapor identified as said working medium;

l. said toroidal pressure vessel being adaptable to a combination of water injectors and gas mixture burner for better fuel economy;

m. said toroidal pressure vessel for flash steam generation also being adaptable for the evaporation of other mediums and which said other mediums may provide better expansion characteristics than conventional steam;

n. an automatic water injector for steam generation being inside said toroidal pressure vessel and said automatic water injector also acts as a governor of revolutions per minute of said output shaft;

o. said automatic water injector being independent of any external power supplies and controls in its performance other than starting and stopping the flow of material to said toroidal pressure vessel;

p. an hydrogen-oxygen mixture burner adaptable to said toroidal pressure vessel for working with at least one said automatic water injector;

q. said hydrogen-oxygen mixture burner simply constructed and easily adjustable for a desired power output and speed of said crankshaft rotation; and r. said combination comprising an integrated steam motor.

15. An integrated steam motor having a toroidal pressure vessel for generating vapor and comprising:

a. a means of adapting to a water injector and to components of water for generating said vapor;

b. a means for connecting to respective cylinders to pass through said vapor under pressure into a high pressure cylinder;

c. a means of enhancing the efficiency of heat transfer between the heat generated outside said toroidal pressure vessel and an evaporating substance inside said toroidal pressure vessel;

d. having reciprocating pistons incorporated with pressure relief valves for vapor scavenging purposes;

e. a means of opening of said relief valve in response to pressure drop at the end of working stroke of the piston;

f. a means of integration of said relief valve with said piston into a working unit; and, g. a means for effective passage of working vapor after opening of said relief valve from said cylinder into vapor exhaust passages.

16. An integrated steam motor having a toroidal pressure vessel for generating vapor and comprising:

a. a means of adapting to a water injector and to components of water for generating said vapor;

b. a means for connecting. to respective cylinders to pass through said vapor under pressure into a high pressure cylinder;

c. a means of enhancing the efficiency of heat transfer between the heat generated outside said toroidal pressure vessel and an evaporating substance inside said toroidal pressure vessel;

d. having an automatic water injector for injection of water into the toroidal pressure vessel to produce flash steam;

e. a means of integrating into a pressure sealed assembly with said toroidal pressure vessel;

f. a means of automatic response to pressure drop in said toroidal pressure vessel;

g. a means of pressure sealing between moving parts in said integrated steam motor;

h. a means of precise measuring and regulating the amount of the injected water; and, i. a means of adjusting the spray of water.

17. An integrated steam motor having an automatic hydrogen-oxygen mixture burner and comprising:

a. a means of adapting to a water injector and to components of water for generating said vapor;

b. a means for connecting to respective cylinders to pass through said vapor under pressure into a high pressure cylinder;

c. a means of enhancing the efficiency of heat transfer between the heat generated outside said toroidal pressure vessel and an evaporating substance inside said toroidal pressure vessel;

d. an automatic hydrogen-oxygen mixture burner;

e. a means of integrating into a pressure sealed assembly with said toroidal pressure vessel;

f. a means of automatic response to pressure drop in said toroidal pressure vessel;

g. a means of precise measuring liquid hydrogen and oxygen for proper and efficient burning;

h. a means for igniting of said mixture of oxygen and hydrogen once injected into said toroidal pressure vessel; and, i. a means of effective seal-off oxygen from hydrogen and both from pressure within said toroidal pressure vessel.

* * * * *